US010547801B2

(12) United States Patent
Cheaz et al.

(10) Patent No.: US 10,547,801 B2
(45) Date of Patent: Jan. 28, 2020

(54) DETECTING AN IMAGE OBSTRUCTION

(71) Applicant: INTERNATIONAL BUSINESS MACHINES CORPORATION, Armonk, NY (US)

(72) Inventors: Nixon Cheaz, Cary, NC (US); Anthony Diaz, Cary, NC (US); Rohit Shetty, Cary, NC (US); Richard A. Gebhardt, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/794,103

(22) Filed: Oct. 26, 2017

(65) Prior Publication Data
US 2019/0132530 A1 May 2, 2019

(51) Int. Cl.
*H04N 5/357* (2011.01)
*G06T 7/70* (2017.01)

(52) U.S. Cl.
CPC ............... *H04N 5/357* (2013.01); *G06T 7/70* (2017.01)

(58) Field of Classification Search
CPC .... H04N 5/357; H04N 5/232; H04N 5/23245; H04N 5/372; H04N 5/225; G06T 7/70
See application file for complete search history.

(56) References Cited

U.S. PATENT DOCUMENTS

| 9,338,348 B2 | 5/2016 | Sivan | |
| 2004/0012682 A1* | 1/2004 | Kosaka | H04N 5/232 348/207.99 |
| 2004/0041936 A1* | 3/2004 | Uchiyama | H04N 5/2176 348/335 |

(Continued)

FOREIGN PATENT DOCUMENTS

WO 2015183889 A1 3/2015

OTHER PUBLICATIONS

Jordan et al., "Detecting Scene Obstruction in a Monocular Industrial Computer Vision Based Measuring System", University of Johannesburg, Johannesburg, South Africa, http://www.prasa.org/proceedings/2010/prasa2010-19.pdf, 2010 (pp. 1-6).

(Continued)

*Primary Examiner* — Abdelaaziz Tissire
(74) *Attorney, Agent, or Firm* — Michael A. Petrocelli, Esq.; Kevin P. Radigan, Esq.; Heslin Rothenberg Farley & Mesiti P.C.

(57) ABSTRACT

Detection of an image obstruction is facilitated by, in part, obtaining multiple frames of an image being captured via an imaging device, and confirming movement of the imaging device between the multiple frames. The movement causes perspective shifting of the image between frames and the perspective shifting results in one or more objects of the image shifting between frames. The detection process determines whether an edge object within the multiple frames does not shift in a manner corresponding to the one or more objects between the multiple frames, and based, at least in (Continued)

part, on determining that the edge object does not shift in the corresponding manner to the one or more objects, identifying the edge object as an image obstruction. Presence of the identified image obstruction is signaled to facilitate corrective action being taken.

20 Claims, 9 Drawing Sheets

(56) References Cited

U.S. PATENT DOCUMENTS

| | | | |
|---|---|---|---|
| 2009/0046197 A1* | 2/2009 | Ishijima | H04N 5/232 348/346 |
| 2011/0075016 A1* | 3/2011 | Shimizu | H04N 5/2171 348/345 |
| 2012/0262569 A1 | 10/2012 | Cudak et al. | |
| 2013/0162839 A1* | 6/2013 | Yoneyama | H04N 5/23212 348/169 |
| 2013/0308004 A1* | 11/2013 | Liu | G06T 7/187 348/222.1 |
| 2014/0267821 A1* | 9/2014 | Masuura | H04N 7/18 348/222.1 |
| 2014/0375835 A1* | 12/2014 | Bos | H04N 5/232 348/220.1 |
| 2015/0163400 A1* | 6/2015 | Geiss | H04N 5/23229 348/231.99 |
| 2016/0004144 A1 | 1/2016 | Laroia et al. | |
| 2016/0028967 A1 | 1/2016 | Sezer et al. | |
| 2016/0144505 A1 | 5/2016 | Fong et al. | |
| 2018/0293735 A1* | 10/2018 | Li | G06T 7/194 |
| 2019/0188879 A1 | 6/2019 | Shen et al. | |

OTHER PUBLICATIONS

Mel, et al., "The NIST Definition of Cloud Computing," National Institute of Standards and Technology, Information Technology Laboratory, Special Publication 800-145, Sep. 2011, (pp. 1-7).

Raghavan et al., "Detection of Scene Obstructions and Persistent View Changes in Tranpsortation Camera Systems", 2012 15th International IEEE Conference on Intelligent Transportation Systems, Anchorage, Alaska, Sep. 16-19, 2012 (pp. 957-962).

International Business Machines Corporation (IBM), "z/Architecture Principles of Operation," IBM® Publication No. SA22-7832-10, Eleventh Edition, Mar. 2015, (pp. 1-1732).

International Business Machines Corporation (IBM), "Power ISA™ Version 2.07B," International Business Machines Corporation, Apr. 9, 2015, (pp. 1-1527).

Rosebrock, Adrian, "OpenCV Track Object Movement", https://www.pyimagesearch.com/2015/09/21/opencv-track-object-movement/, Sep. 21, 2015 (pp. 1-14).

* cited by examiner

DETECTING AN IMAGE OBSTRUCTION

BACKGROUND

An imaging device, such as a camera, smartphone, tablet or other device with image and/or video capture capabilities, is an instrument capable of recording or capturing images. The images may be individual still images, such as photographs, or sequences of images, constituting a video.

An issue that most people can relate to is that too frequently an image, such as a photograph, taken using a handheld imaging device may show include an unintended obstruction, such as one or more of the holder's fingers appearing within the photograph. Other times, other obstructions, such as a clothing item or other impediment could interfere with or block a portion of the field of view of the lens of the imaging device. Not only can this issue be an inconvenience, but in certain situations the problem may transcend monetary value, as moments captured on an imaging device may be temporal and have potentially high sentimental and/or nostalgic value that are hard to quantify and/or replicate.

SUMMARY

The shortcomings of the prior art are overcome and additional advantages are provided through the provision, in one embodiment, of a method which includes: obtaining multiple frames of an image being captured via an imaging device, and confirming movement of the imaging device between the multiple frames. The movement of the imaging device causes perspective shifting of the image between frames, with the perspective shifting causing one or more objects of the image to shift between frames. Further, the method includes determining whether an edge object within the multiple frames does not shift in a corresponding manner to the one or more objects between the multiple. Based, at least in part, on determining that the edge object does not shift in the corresponding manner to the one or more objects between the multiple frames, identifying the edge object as an image obstruction. Upon identifying the image obstruction, the method includes signaling presence of the identified image obstruction to facilitate corrective action being taken.

Systems and computer program products relating to one or more aspects are also described and claimed herein. Further, services relating to one or more aspects may also be described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired by a particular application, for instance, to facilitate detecting an image obstruction.

The illustrative embodiments may be described using specific code, designs, architectures, protocols, layouts, schematics, or tools only as examples, and are not limiting to the illustrative embodiments. Furthermore, the illustrative embodiments are described in some instances using particular software, tools, and data processing environments only as example for clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

As used herein, an imaging device refers to any device, apparatus, system, subsystem, component, module, etc. designed for or capable of capturing an image, with cameras, smartphones, tablets, etc., being examples of an imaging device. Note further that "imaging device" and "image" referred to herein are also inclusive of a video capture device, or video, respectively.

Figure 1:
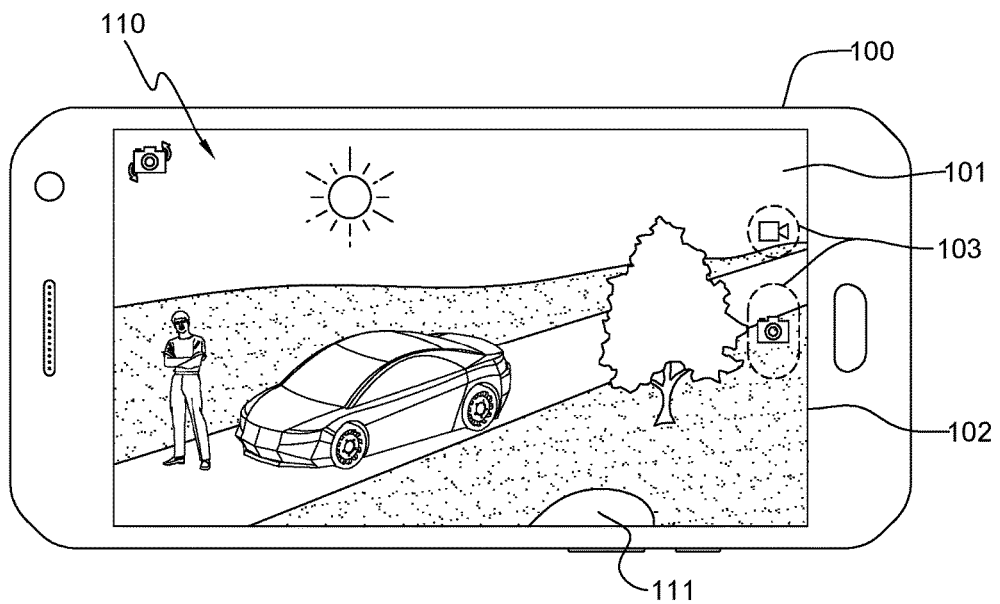
FIG. 1 depicts one embodiment of an imaging device capturing an image that includes a potential obstruction to be detected, in accordance with one or more aspects of the present invention.

FIG. 1 depicts one embodiment of an imaging device 100, such as a smartphone, tablet, etc. Imaging device 100 is shown to include imaging capabilities, such as one or more cameras, and to have a display 101, with an image edge 102, and one or more camera controls 103. As shown, during image capture one or more objects 110 within the image may appear within the display, and thus, within the imaged frame, as well as one or more edge objects 111 at edge 102 of the image display. For instance, and by way of example only, edge object(s) 111 may be one or more potential obstructions, such as a user's finger or thumb, appearing at an edge of the image, i.e., at an edge of the field of view of the imaging device. Disclosed herein, in one or more aspects, is a facility for detecting such unintended obstruction(s) of the imaging device's field of view.

Figure 2:
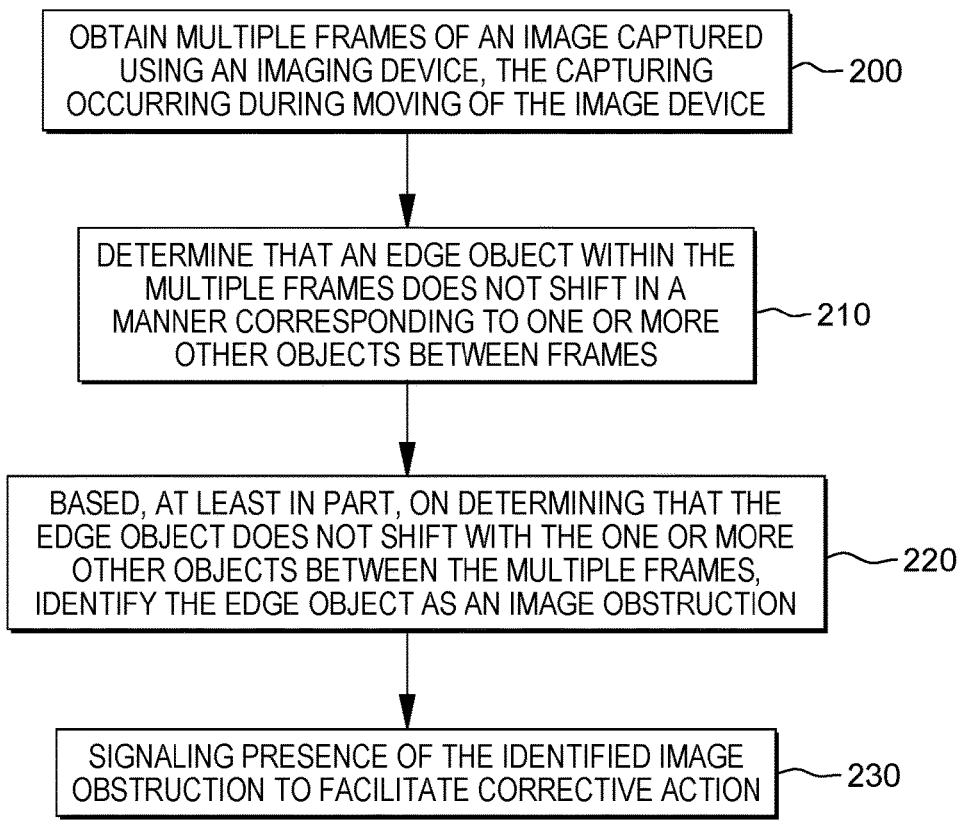
FIG. 2 depicts one embodiment of processing, in accordance with one or more aspects of the present invention.

FIG. 2 depicts one embodiment of a process, in accordance with one or more aspects of the present invention. As shown, obstruction detection is facilitated by obtaining multiple frames of an image captured using an imaging device. The perspective of imaging device moves between the capturing of the multiple frames 200. Processing determines that an edge object within the multiple frames does not shift in a manner corresponding to the one or more other objects between frames 210, and based, at least in part, on determining that the edge object does not shift in the corresponding manner to the one or more objects between the frames 220, identifies the edge object as an image obstruction. Presence of the identified image obstruction may be signaled to facilitate corrective action taken 230.

By determining, or confirming, movement of the imaging device during capture of the multiple frames of an image, respective perspective shifts of the imaging device can be used to detect unintended edge obstructions, such as a user's finger or thumb that do not move with the rest of the image. For instance, when a user is holding the imaging device and pointing the device at a target to be imaged, there may be irregular motion of the device by the holder on the way to arriving at a perfect image (or perfect perspective). During this irregular motion, the image perspective being (or to be) captured shifts as the imaging device moves. In one or more implementations, software processing such as disclosed herein takes advantage of this irregular motion of the imaging device to identify an image obstruction, such as an edge object partially blocking the device's field of view. This obstruction generally will not shift in a way that correlates with the shifting of other objects within the image with the changing perspective. Once the obstruction is detected, the user can be notified of the issue, such as by vibrating the imaging device or providing an audio signal from the device, while still allowing the photo to be taken, or the device could prevent a photo from being taken, or the user could be presented with a cropping option, or even a cropped version of the photo with the obstruction automatically removed.

Figure 3A:
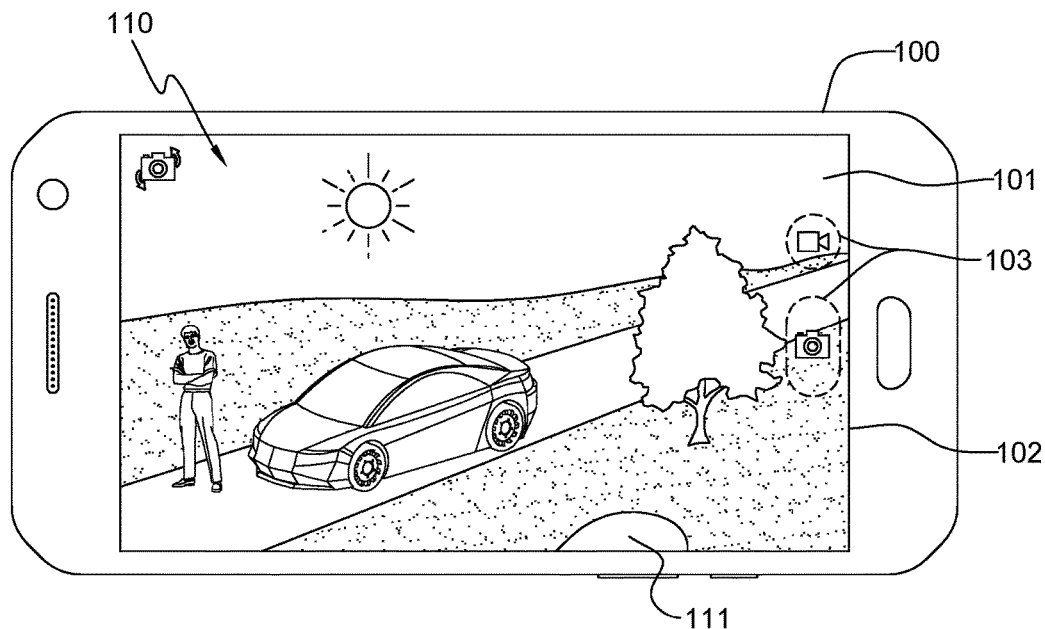
FIGS. 3A-3C depict a sequence of frames of an image being captured via an imaging device, and that include a potential obstruction to be detected, in accordance with one or more aspects of the present invention.
Figure 3B:
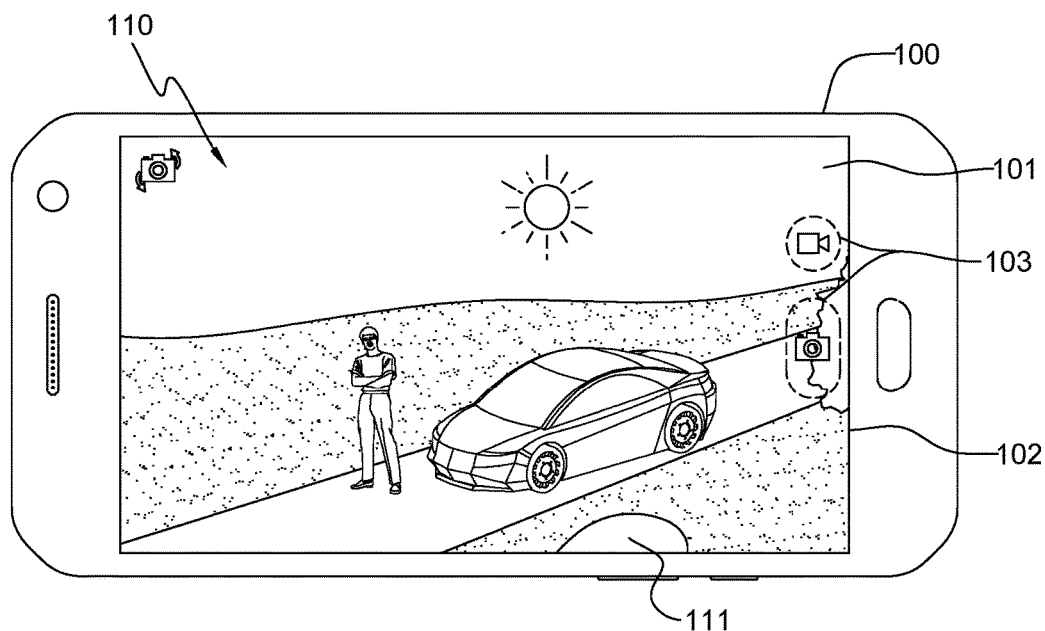
Figure 3C:
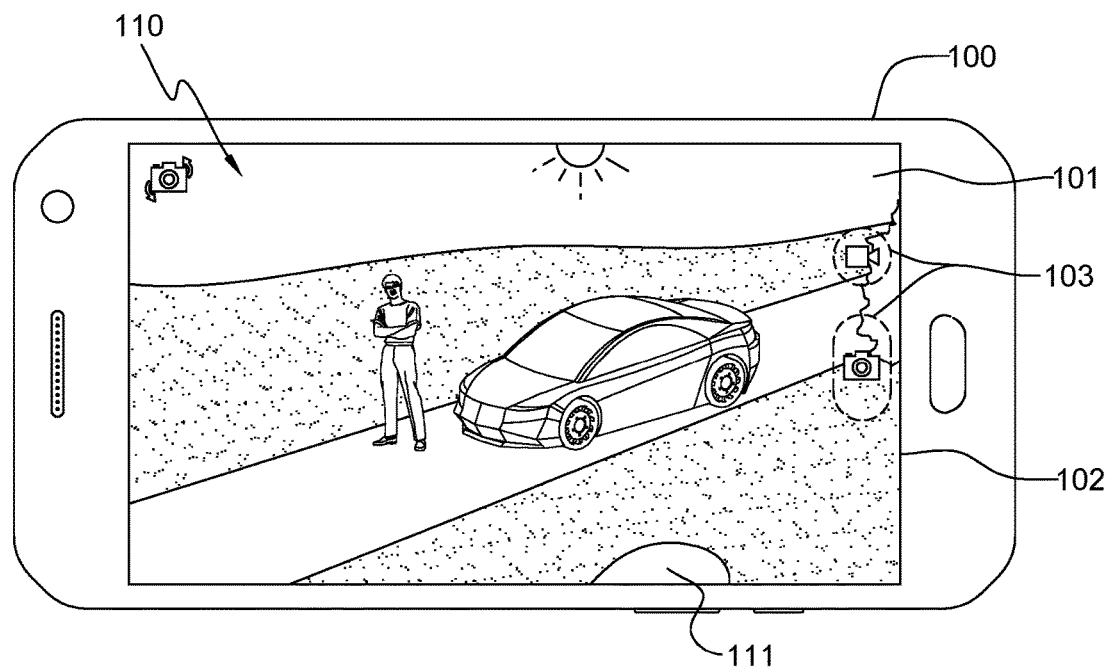

FIGS. 3A-3C depict an example of perspective shifts occurring with movement of an imaging device. The imaging device, such as a camera, smartphone, tablet, etc., is turned on, and the user arranges the position of the device to take a snapshot of a target image, which may include one or more objects to be imaged. During this process of arranging the imaging device to point to a specific target image, the lens and device may capture the changing frames continually, and processing may analyze the perspective changes from the continual motion of the camera from one instance to the next. Note that the processing disclosed herein may be utilized differently in different implementations. For instance, in one or more implementations, the capturing of a sequence of frames (e.g., two or more frames) could be at an abstraction layer of the imaging device before the user of the device actually takes a snapshot. In other implementations, the processing disclosed herein could be analyzing a sequence of snapshots taken by a user to signal to the user the existence of the obstruction in the images taken.

In a normal non-obstructed image, the objects within the image may move in unison (that is, assuming the objects are not themselves in motion) in the same general direction as would be expected from a change in the perspective of the imaging device. For instance, as the imaging device moves, nearby objects will shift position slightly more than far away objects. See in this regard FIGS. 3A-3C, wherein objects within the frames shift from FIG. 3A to 3B, and from FIG. 3B to 3C with movement of the imaging device. If a user's thumb or finger (or other item) partially obstructs the camera lens, then the obstruction may show as an edge object 111 which will generally stay motionless in comparison to movement of the other objects within the image as the imaging device is changed slightly from one perspective to the next. Note that the edge object does not need to be stationary to be detected as an obstruction, as it can also move, but will likely not move in the same pattern as the rest of the objects in the image due to the shifting focal point.

FIGS. 3A-3C illustrate the perspective change effect on the position of an edge obstruction on the imaging device lens in comparison to the other objects 110 within the image as the imaging device is moved in search of a desired focal point of the image to be photographed or video recorded. FIG. 3A depicts a target image which includes an individual and the sun in the background. On a bright sunny day, it is not uncommon to miss the slight obstruction on the edge of the image frame due, for instance, to a part of the user's hand or a clothing item obstructing the field of view. Note that in FIG. 3A, the individual within the image is on the left side of the frame, while in FIG. 3B, the focal point of the imaging device has moved, for instance, a fraction of a second later such that the individual is now moved towards the middle of the frame, and in FIG. 3C, the individual has been moved up within the frame due to further movement of the device. Notice also that the edge obstruction 111 remains in a substantially fixed position in this example between the different frames notwithstanding movement of the imaging device, which results in the shifting of the individual and the other objects within the image between the frames. By analyzing the frames, processing can thus identify the edge object as an obstruction, and with a relatively high confidence level indicate that the object is due to an obstruction of the device lens. In one or more implementations, the imaging device could warn the user of the situation, for instance, with a vibration or audio signal. The user can then take the photo or video if they choose, or make an adjustment to avoid or remove the obstruction. If the user chooses to take the picture despite the warning of the potential obstruction, processing (e.g., software) can note that the obstruction may be unwanted and offer to crop the obstruction at a later time automatically, for instance, should the user approve.

Figure 4:
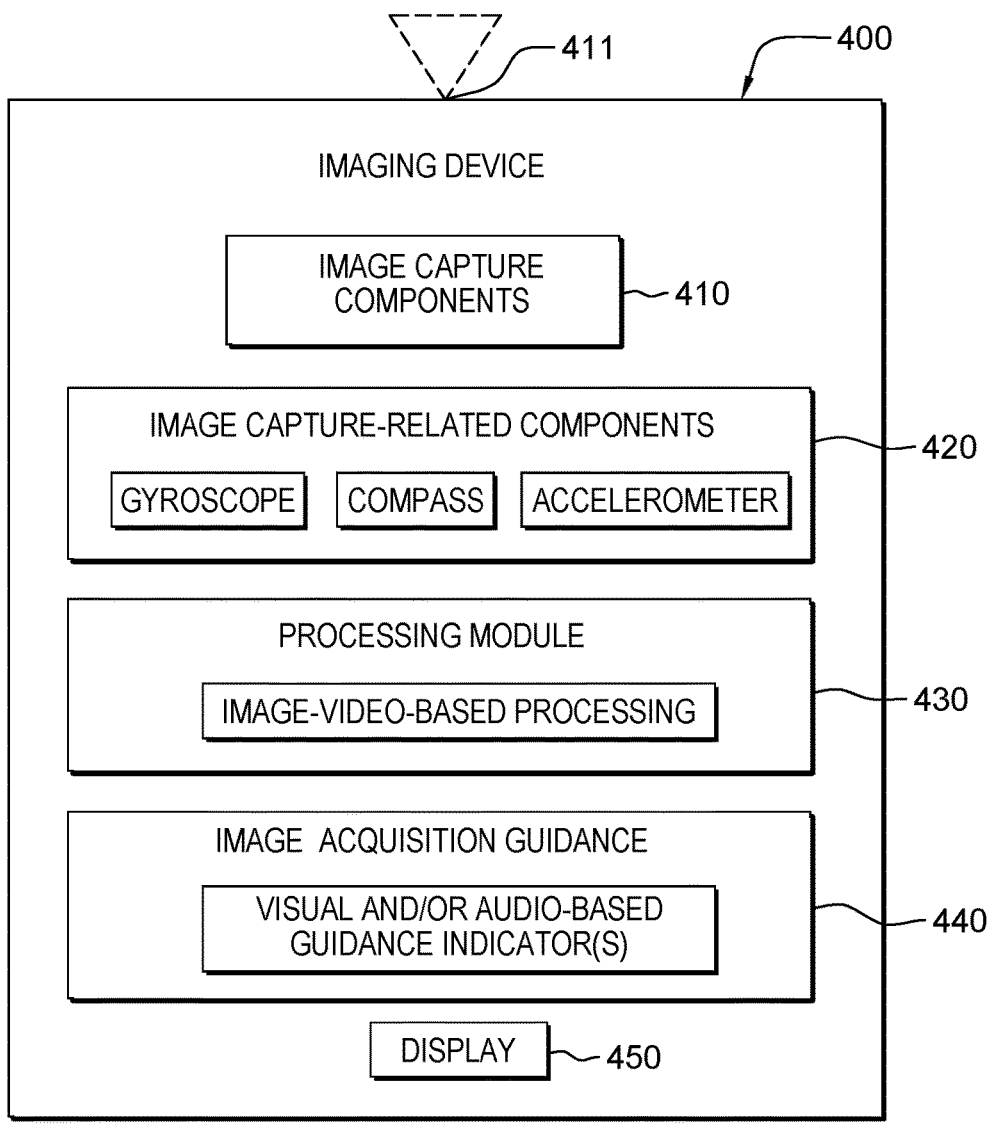
FIG. 4 is a conceptual diagram of one embodiment of an imaging device with obstruction detection and image guidance, in accordance with one or more aspects of the present invention.

By way of example, FIG. 4 depicts one conceptual embodiment of an imaging device 400, in accordance with one or more aspects of the present invention. As shown, imaging device 400 may include image capture components 410, such as conventional image or video camera components (including an image lens 411), image capture related components 420 (which may optionally include gyroscope hardware, compass hardware, and/or accelerometer hardware to detect movement of the imaging device), an image processing module 430, which may include image-video-based processing such as disclosed herein, an image acquisition guidance module 440, which may include or provide visual and/or audio-based image guidance indicators to the user, and an image display 450. Note that the imaging device 400 may include many additional components, modules, subsystems, etc., without departing from the spirit of the present invention.

In one or more implementations, one or more aspects of the processing disclosed herein may be integrated within imaging device 400, such as within processing module 430, or could be remotely implemented, such as via communication with a cloud-based service. Further, note that one or more of the gyroscope, compass and/or accelerometer may be provided in association with the imaging device for use in addition to or in place of analyzing a series of frames to determine perspective shift of objects within the frames with movement of the imaging device. For instance, one or more of the capture-related components 420 could independently detect movement of the imaging device during capture of a sequence of frames with, in one or more implementations, the facility disclosed herein evaluating the frames to detect, for instance, one or more edge objects which do not move with the shifting perspective between frames.

Figure 5:
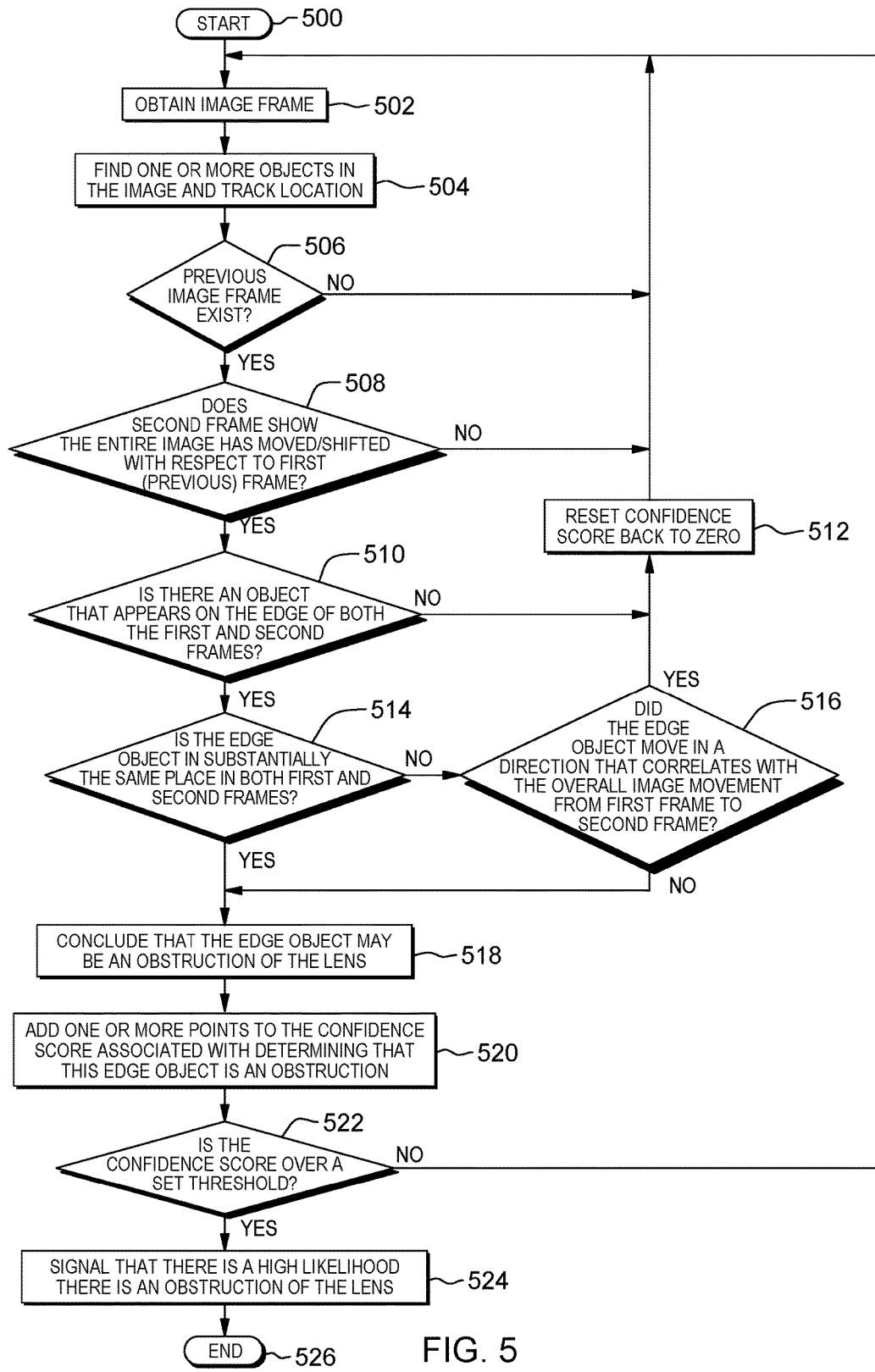
FIG. 5 depicts a further embodiment of processing, in accordance with one or more aspects of the present invention.

By way of further explanation, FIG. 5 depicts a more detailed embodiment of processing, in accordance with one or more aspects of the present invention. The process starts 500 with obtaining an image frame 502, finding one or more objects within the image frame and tracking their location 504. This process can be implemented in a variety of manners by one skilled in the art. For instance, Open Source Computer Vision (OpenCV) is an open source library of computer functions with, for instance, python, C/C++, Java bindings that allow ready tracking of objects and their movement in a series of image frames.

Processing determines whether a previous image frame exists in the sequence of frames 506. If "no", then a next image frame in the sequence is obtained 502. Otherwise, processing determines whether the second frame shows the entire image has moved or shifted with respect to the first frame 508. If there has been no movement of the imaging device, and thus, no shifting of the image, processing obtains a further image frame 502. Otherwise, processing determines whether there is an object (i.e., an edge object) that appears at an edge of both the first and second frames 510. If "no", then there is no edge obstruction, and processing resets any confidence score level associated with the current image 512.

Assuming that there is an edge object at the edge of both the first and second frames, then processing determines whether the edge object is substantially in the same place in both the first and second frames 514. If "no", then the processing determines whether the edge object moved in a direction that correlates with the overall movement of other objects within the frames from the first frame to the second frame 516. If the edge object does move in a direction that correlates with the overall image movement, then the confidence score associated with the first and second frames is reset 512. Otherwise, an edge object is identified, which is either in the same place in both the first and second frames or has a motion that does not correlate with the overall image movement, and a conclusion is made that the edge object may be an obstruction of the device lens 518. Based on this, one or more points may be added to a confidence score associated with the edge object indicative of whether the object is an obstruction 520. Processing determines whether the confidence score is now over a set threshold 522. If "no", then a further image frame is obtained 502. Assuming that the confidence score is over the threshold, which may be a predefined threshold, then processing signals a high likelihood that there is an obstruction of the lens 524, which completes detecting of the image obstruction 526.

Those skilled in the art will note from the present description that aspects of the invention provide a simple, commercially viable approach to identifying image obstructions, particularly when compared against other approaches. For instance, the approach disclosed herein requires no approved training image to compare a current image to, and it uses comparatively little computer power since there is little advanced image analysis required as the camera is being pointed to and focused on a target. Also, the imaging device and facility disclosed herein may be implemented using a single lens, instead of requiring an extra lens or other hardware which would add to the cost of the device.

In one or more implementations, perspective changes of an image may be used to identify an obstruction of lens's line of sight. The processing disclosed can be implemented, in part, using existing open source image tracking software and exploiting the chaotic motion of a user's imaging device when handheld and searching for the desired perspective. There is no need for a trained image database to identify obstructions. Further, there is no need to compare a good unobstructed image with a current one to detect whether something is an obstruction or part of an intended image. Additionally, there is no need for sophisticated analysis that can be expensive computationally, and not sufficiently reliable. In one or more implementations, a warning may be provided of the obstruction once identified, while still allowing the user to take a photograph or video clip. In such an approach, the user may then be offered an opportunity to approve an automated cropping of the obstruction with the click of a button on the imaging device.

As disclosed herein, perspective shifting is used to identify potential obstructions, which in one or more implementations may experience a relative lack of motion compared with other objects being imaged. A series of two or more consecutive frames may be used to show a perspective change. Advantageously, obstructions may be identified with good accuracy using only a few frames of motion. The processing disclosed herein may be applied to any imaging device. In one or more embodiments, the aspects disclosed herein do not add extra bulk, size, or weight to the imaging device, being, for instance, a software based solution to detecting an obstruction.

Those skilled in the art will note that disclosed herein are a method, system and computer program product for facilitating detecting of an image obstruction. The method includes, for instance, obtaining multiple frames of an image being captured via an imaging device, and confirming movement of the imaging device between the multiple frames. The movement causes perspective shifting of the image between the multiple frames, and the perspective shifting causes one or more objects of the image to shift between the frames. The method includes determining, by a processor, whether an edge object within the multiple frames does not shift in a corresponding manner to the one or more objects between the multiple frames. Based, at least in part, on determining that the edge object does not shift in the corresponding manner to the one or more objects between the multiple frames, the edge object may be identified as an image obstruction. Upon identifying the image obstruction, presence of the image obstruction may be signaled in order to facilitate corrective action being taken.

In one or more implementations, the method further includes, prior to the determining, identifying presence of the edge object within the multiple frames, the edge object being an object at an edge of the multiple frames. In one or more implementations, the determining may include determining that the edge object within the multiple frames remains at a substantially fixed location within the multiple frames notwithstanding the perspective shifting of the imaging device between the multiple frames. Further, in one or embodiments, the determining may include determining that the edge object within the multiple frames shifts in a direction that does not correlate with the shifting of the one or more objects between the multiple frames.

In one or more embodiments, the confirming may include comparing content of the multiple frames to confirm that the perspective of the image has shifted between the multiple frames. In one or more implementations, based on determining that the edge object does not shift with the one or more objects between the multiple frames, the method may include increasing a confidence score that the edge object is an image obstruction, and the identifying may include determining whether the confidence score exceeds a set threshold, with the identifying occurring when the confidence score exceeds the set threshold. For instance, the obtaining, confirming and determining may be repeated until the confidence score exceeds the set threshold, and the edge object is identified as an image obstruction.

In one or more embodiments, the signaling may include at least one of vibrating the imaging device or providing an imaging device audio signal to notify a user of the device of the presence of the identified image obstruction. Further, a cropping option may be provided to the user to facilitate removal of the identified image obstruction from the image.

In one or more other embodiments, a method and system for detecting and warning a user of an object obstructing an imaging device, such as a camera lens, is provided. The method includes detecting an object obstructing the imaging device lens when a user is readying to take an image. The imaging device is assumed to have processing or computer capabilities or be in communication with a computer capable of implementing the processing disclosed herein. The method includes warning the user of an obstruction of the device lens enabling the user to take evasive action pertaining to the obstruction, and if desired, initiating a cropping option for the image when the user takes the image despite the warning to the user of the obstruction. In one or more embodiments, detecting the obstruction may include changing perspective of the image, including shifting a frame of the image with respect to a focal point of the image. The changing perspective may be used as described herein to facilitate ascertaining whether an edge object is an obstruction or a part of the intended image. In one or more embodiments, analyzing the series of frames may be used to determine when the object is an obstruction of part of the image being taken.

Exemplary embodiments of a computing environment which could implement one or more aspects of the present invention are described below with reference to FIGS. 6-8.

Figure 6:
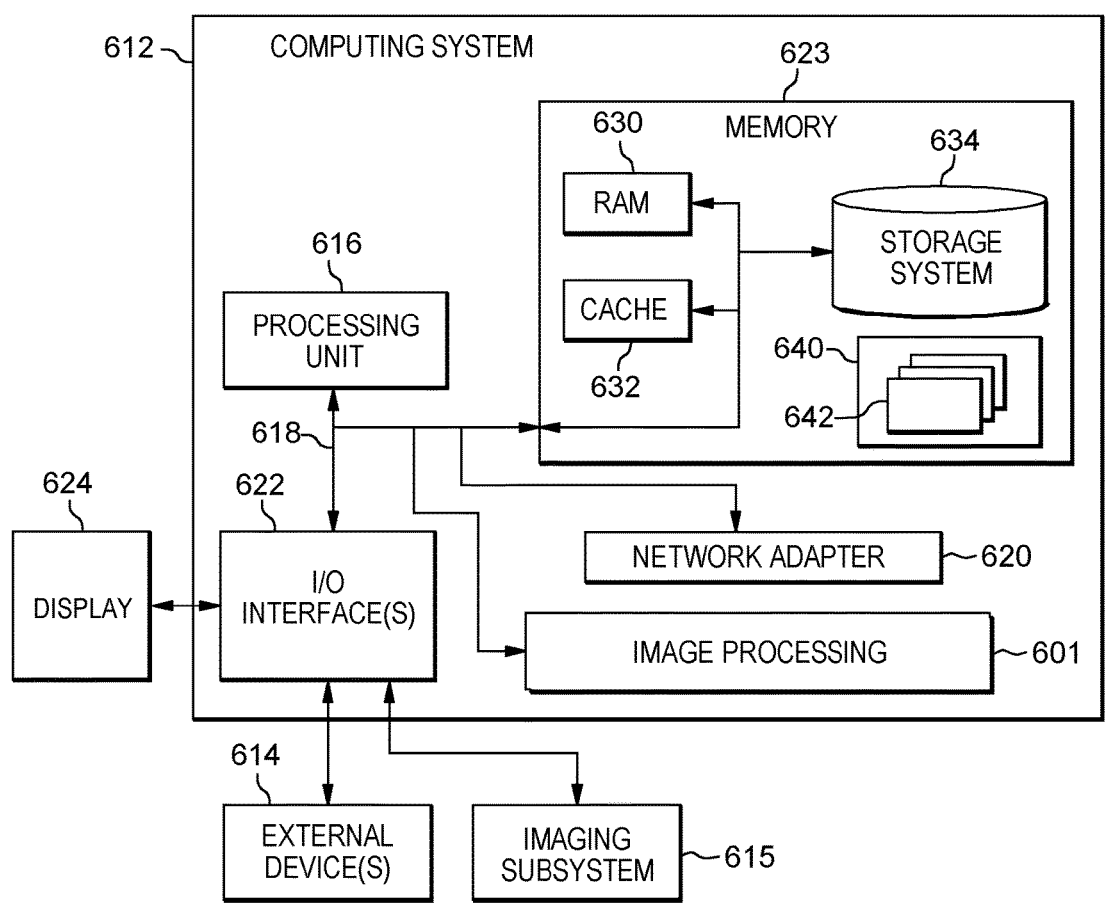
FIG. 6 depicts one embodiment of a computing system which may implement or facilitate implementing image processing, in accordance with one or more aspects of the present invention.

By way of further example, FIG. 6 depicts one embodiment of a computing environment 600, which includes a computing system 612. Examples of well-known computing systems, environments, and/or configurations that may be suitable for use with computer system 612 include, but are not limited to, a server, a desktop computer, a work station, a mobile device, such as a wireless computer, a handheld or laptop computer or device, a mobile phone, a programmable consumer electronic device, a tablet, a personal digital assistant (PDA), or the like.

Computing system 612 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 6, computing system 612, is shown in the form of a general-purpose computing device. The components of computing system 612 may include, but are not limited to, one or more processors or processing units 616, a system memory 623, and a bus 618 that couples various system components including system memory 623 to processor 616.

In one embodiment, processor 616 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 612 may include a variety of computer system readable media. Such media may be any available media that is accessible by computing system 612, and it includes both volatile and non-volatile media, removable and non-removable media.

System memory 623 can include computer system readable media in the form of volatile memory, such as random access memory (RAM) 630 and/or cache memory 632.

Computing system 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 618 by one or more data media interfaces. As described below, memory 623 may include at least one program product having a set (e.g., at least one) of program modules that are configured to carry out the functions of embodiments of the invention.

Program/utility 640, having a set (at least one) of program modules 642, may be stored in memory 623 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. Alternatively, a separate image processing system, module, logic, etc., 601 may be provided within computing environment 612.

Computing system 612 may also communicate with one or more external devices 614 such as an imaging subsystem 615, a keyboard, a pointing device, a display 624, etc.; one or more devices that enable a user to interact with computing system 612; and/or any devices (e.g., network card, modem, etc.) that enable computing system 612 to communicate with one or more other computing devices. Such communication can occur via Input/Output (I/O) interfaces 622. Still yet, computing system 612 can communicate with one or more networks such as a local area network (LAN), a general wide area network (WAN), and/or a public network (e.g., the Internet) via network adapter 620. As depicted, network adapter 620 communicates with the other components of computing system, 612, via bus 618. It should be understood that although not shown, other hardware and/or software components could be used in conjunction with computing system 612. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 6. Computing system 612 of FIG. 6 may be practiced in distributed cloud computing environments where tasks are performed by remote processing devices that are linked through a communications network. In a distributed cloud computing environment, program modules may be located in both local and remote computer system storage media including memory storage devices. Computing system 612 is capable of being implemented and/or performing any of the functionality set forth hereinabove.

Figure 7:
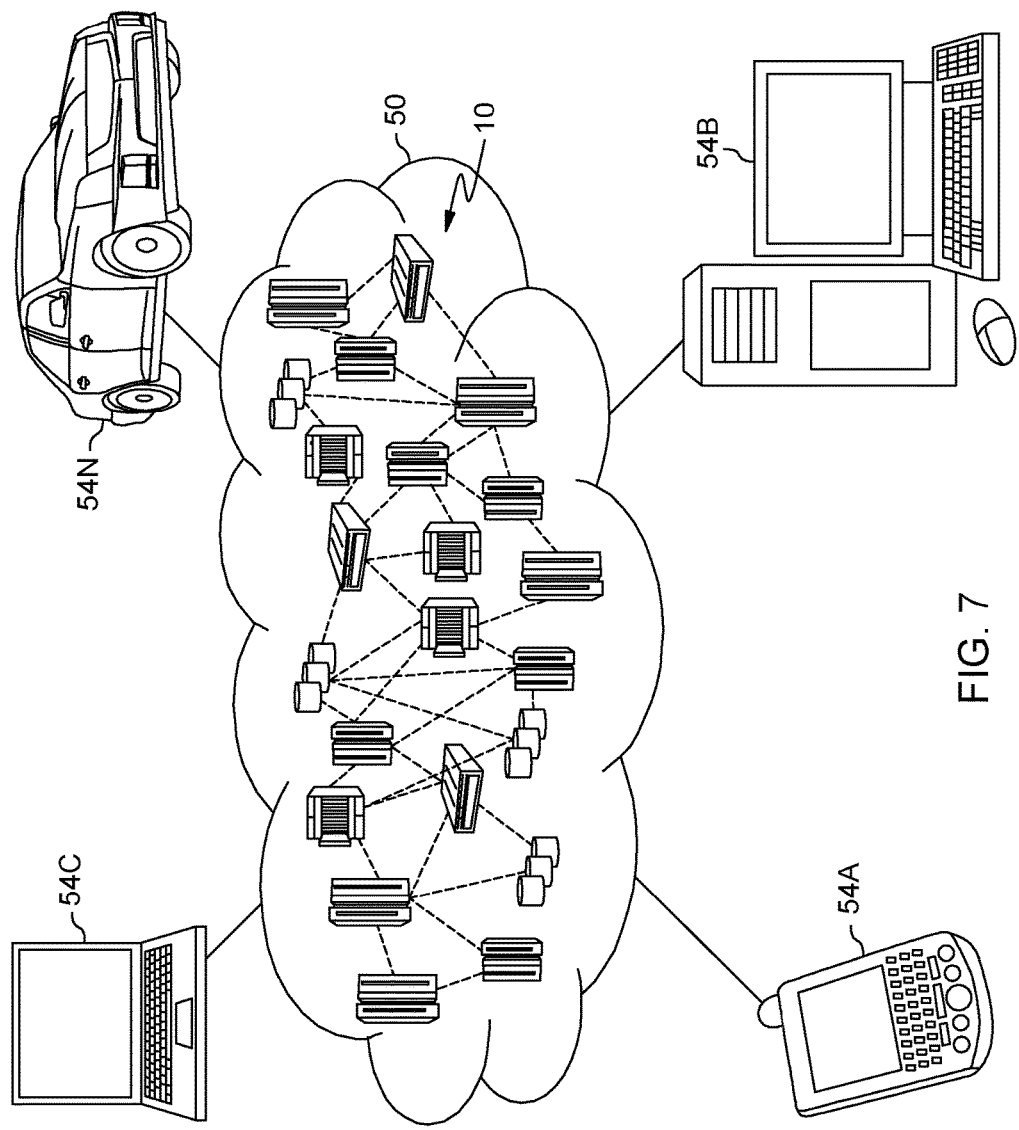
FIG. 7 depicts one embodiment of a cloud computing environment which may facilitate implementing, or be used in association with one or more aspects of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 8:
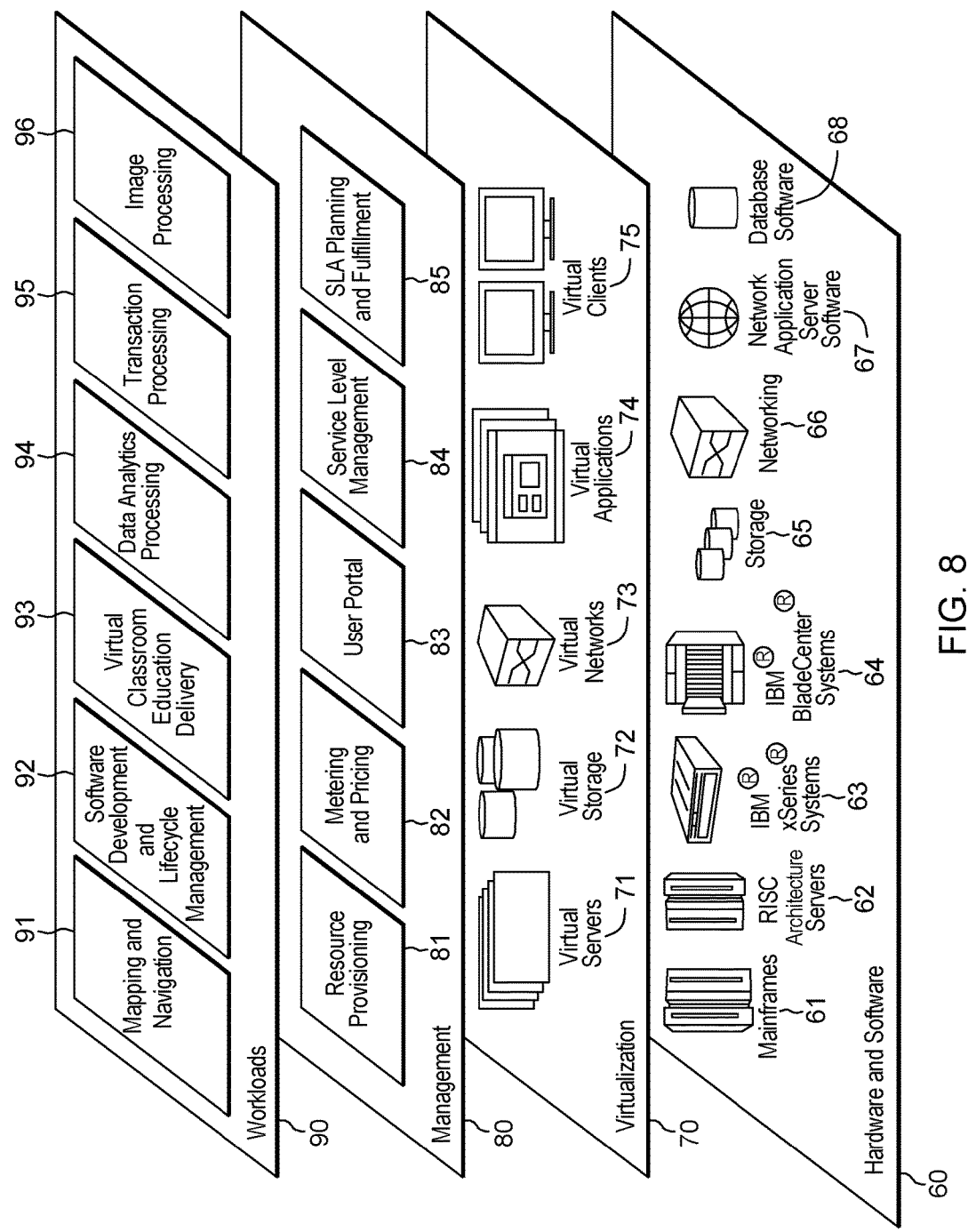
FIG. 8 depicts an example of extraction model layers, which may facilitate implementing image processing, in accordance with one or more aspects of the present invention.

Referring to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method comprising:
   obtaining multiple frames of an image being captured via an imaging device;
   confirming movement of the imaging device between the multiple frames, the movement causing perspective shifting of the image between the multiple frames, the perspective shifting causing one or more objects of the image to shift between frames;
   determining, by a processor, whether an edge object within the multiple frames does not shift in a corresponding manner to the one or more objects between the multiple frames;
   based, at least in part, on determining that the edge object does not shift in the corresponding manner to the one or more objects between the multiple frames, assigning one or more points to a confidence score for the edge object, the confidence score being an accumulation of points based on the assigning;
   comparing the confidence score to a set threshold, the set threshold being pre-defined and indicating that the edge object is an image obstruction;
   based on the confidence score not exceeding the set threshold, repeating the obtaining, confirming, determining, assigning, and comparing until the confidence score exceeds the set threshold or the confidence score is reset;
   based on the confidence score exceeding the set threshold, identifying the edge object as the image obstruction; and
   based on the identifying, signaling presence of the identified image obstruction to facilitate corrective action.

2. The method of claim 1, further comprising, prior to the determining, identifying presence of the edge object within the multiple frames, the edge object being an object at an edge of the multiple frames.

3. The method of claim 2, further comprising resetting the confidence score based on the edge object shifting correspondingly to the one or more objects between the multiple frames.

4. The method of claim 1, wherein the determining comprises determining that the edge object within the multiple frames remains at a substantially fixed location between the multiple frames notwithstanding the perspective shifting of the imaging device between the multiple frames.

5. The method of claim 1, wherein the determining further comprises determining that the edge object within the multiple frames shifts in a direction that does not correlate with the shifting of the one or more objects between the multiple frames.

6. The method of claim 1, wherein the confirming comprises comparing content of the multiple frames to confirm that the perspective of the image has shifted between the multiple frames.

7. The method of claim 1, wherein the signaling comprises at least one of vibrating the imaging device or providing an imaging device audio signal to notify a user of the imaging device of the presence of the identified image obstruction.

8. The method of claim 1, further comprising providing a cropping option to facilitate removal of the identified image obstruction from the image.

9. The method of claim 1, further comprising prior to the determining, resetting the confidence score based on the edge object not being identified within the multiple frames.

10. A system for facilitating detecting of an image obstruction, the system comprising:
    a memory; and a processing circuit communicatively coupled to the memory, wherein the system performs a method comprising:
- obtaining multiple frames of an image being captured via an imaging device;
- confirming movement of the imaging device between the multiple frames, the movement causing perspective shifting of the image between the multiple frames, the perspective shifting causing one or more objects of the image to shift between frames;
- determining whether an edge object within the multiple frames does not shift in a corresponding manner to the one or more objects between multiple frames;
- based, at least in part, on determining that the edge object does not shift in the corresponding manner to the one or more objects between the multiple frames, assigning one or more points to a confidence score for the edge object, the confidence score being an accumulation of points based on the assigning;
- comparing the confidence score to a set threshold, the set threshold being pre-defined and indicating that the edge object is an image obstruction;
- based on the confidence score not exceeding the set threshold, repeating the obtaining, confirming, determining, assigning, and comparing until the confidence score exceeds the set threshold or the confidence score is reset;
- based on the confidence score exceeding the set threshold, identifying the edge object as the image obstruction; and
- based on the identifying, signaling presence of the identified image obstruction to facilitate corrective action.

11. The system of claim 10, further comprising, prior to the determining, identifying presence of the edge object within the multiple frames, the edge object being an object at an edge of the multiple frames.

12. The method of claim 11, further comprising resetting the confidence score based on the edge object shifting correspondingly to the one or more objects between the multiple frames.

13. The system of claim 10, wherein the determining comprises determining that the edge object within the multiple frames remains at a substantially fixed location between the multiple frames notwithstanding the perspective shifting of the imaging device between the multiple frames.

14. The system of claim 10, wherein the determining further comprises determining that the edge object within the multiple frames shifts in a direction that does not correlate with the shifting of the one or more objects between the multiple frames.

15. The system of claim 10, wherein the confirming comprises comparing content of the multiple frames to confirm that the perspective of the image has shifted between the multiple frames.

16. The method of claim 10, further comprising prior to the determining, resetting the confidence score based on the edge object not being identified within the multiple frames.

17. A computer program product for facilitating detecting an image obstruction, the computer program product comprising:
- a computer readable storage medium having computer readable program code embodied therewith, the computer readable program code being executable by a processor to perform a method comprising:
  - obtaining multiple frames of an image being captured via an imaging device;
  - confirming movement of the imaging device between the multiple frames, the movement causing perspective shifting of the image between the multiple frames, the perspective shifting causing one or more objects of the image to shift between frames;
  - determining whether an edge object within the multiple frames does not shift in a corresponding manner to the one or more objects between multiple frames;
  - based, at least in part, on determining that the edge object does not shift in the corresponding manner to the one or more objects between the multiple frames, assigning one or more points to a confidence score for the edge object, the confidence score being an accumulation of points based on the assigning;
  - comparing the confidence score to a set threshold, the set threshold being pre-defined and indicating that the edge object is an image obstruction;
  - based on the confidence score not exceeding the set threshold, repeating the obtaining, confirming, determining, assigning, and comparing until the confidence score exceeds the set threshold or the confidence score is reset based on the confidence score exceeding the set threshold, identifying the edge object as the image obstruction; and
  - based on the identifying, signaling presence of the identified image obstruction to facilitate corrective action.

18. The computer program product of claim 17, further comprising, prior to the determining, identifying presence of the edge object within the multiple frames, the edge object being an object at an edge of the multiple frames.

19. The computer program product of claim 17, wherein the determining comprises determining that the edge object within the multiple frames remains substantially fixed location between the multiple frames notwithstanding the perspective shifting of the imaging device between the multiple frames.

20. The computer program product of claim 17, wherein the determining further comprises determining that the edge object within the multiple frames shifts in a direction that does not correlate with the shifting of the one or more objects between the multiple frames.

* * * * *